(12) United States Patent
Hunter et al.

(10) Patent No.: US 11,954,702 B2
(45) Date of Patent: **\*Apr. 9, 2024**

(54) IDENTIFYING CONSUMERS ONLINE FOR PROVIDING OFFERS AND COUPON VALIDATION ONLINE, IN REAL-TIME, AND AT THE POINT OF SALE

(71) Applicant: Catalina Marketing Corporation, St. Petersburg, FL (US)

(72) Inventors: Kevin Hunter, La Jolla, CA (US); Joshua Herzig-Marx, Newton, MA (US); Benjamin S. Sprecher, Newton, MA (US); Mark Bees, Needham, MA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/567,746

(22) Filed: Jan. 3, 2022

(65) Prior Publication Data
US 2022/0122114 A1 Apr. 21, 2022

Related U.S. Application Data

(63) Continuation of application No. 16/237,007, filed on Dec. 31, 2018, now Pat. No. 11,216,837.
(Continued)

(51) Int. Cl.
*G06Q 30/0226* (2023.01)
*G06F 21/31* (2013.01)
(Continued)

(52) U.S. Cl.
CPC ......... *G06Q 30/0229* (2013.01); *G06F 21/31* (2013.01); *G06Q 20/20* (2013.01);
(Continued)

(58) Field of Classification Search
None
See application file for complete search history.

(56) References Cited

U.S. PATENT DOCUMENTS

| 7,788,129 B2 | 8/2010 | Antonucci et al. |
| 9,027,827 B2 | 5/2015 | Dessert et al. |

(Continued)

FOREIGN PATENT DOCUMENTS

| JP | 2011-23041 A | 2/2011 |
| JP | 2017-76380 A | 4/2017 |

(Continued)

OTHER PUBLICATIONS

Krumm ("Ubiquitous Advertising: The Killer Application for the 21st Century," IEEE Pervasive Computing, vol. 10, No. 1, pp. 66-73, Jan.-Mar. 2011) (Year: 2011).*

(Continued)

*Primary Examiner* — Christopher B Tokarczyk
(74) *Attorney, Agent, or Firm* — McDermott Will & Emery LLP

(57) ABSTRACT

A method, including receiving, from a consumer, a client device identification though an application running in a client device, is provided. The method includes matching the client device identification with a loyalty card for a retail store, identifying a shopping history for consumer, associated with the retail store, in a database, based on the loyalty card, and requesting, through the application, an information from consumer, based on the shopping history. The method further includes verifying the identity of consumer when at least a portion of the information matches the shopping history associated with the retail store, for consumer, and providing an offer to consumer, through the application running in the client device, of a product in the retail store. A system and a non-transitory, computer readable medium (Continued)

storing instructions to perform the above method are also provided.

20 Claims, 9 Drawing Sheets

Related U.S. Application Data

(60) Provisional application No. 62/613,347, filed on Jan. 3, 2018, provisional application No. 62/613,344, filed on Jan. 3, 2018, provisional application No. 62/612,934, filed on Jan. 2, 2018.

(51) Int. Cl.
*G06Q 20/20* (2012.01)
*G06Q 30/0207* (2023.01)
*G06Q 30/0241* (2023.01)

(52) U.S. Cl.
CPC ..... *G06Q 30/0207* (2013.01); *G06Q 30/0222* (2013.01); *G06Q 30/0224* (2013.01); *G06Q 30/0277* (2013.01)

(56) References Cited

U.S. PATENT DOCUMENTS

| | | | |
|---|---|---|---|
| 9,396,376 B1* | 7/2016 | Narayanaswami | G06K 19/145 |
| 10,129,234 B2 | 11/2018 | Uetabira | |
| 10,148,635 B2 | 12/2018 | Huh et al. | |
| 2002/0161641 A1 | 10/2002 | Quinlan | |
| 2005/0187873 A1* | 8/2005 | Labrou | G06Q 20/326 705/40 |
| 2012/0266227 A1* | 10/2012 | Colson | G06Q 30/06 726/7 |
| 2013/0046604 A1* | 2/2013 | Jones | G06Q 30/0229 705/14.27 |
| 2015/0127427 A1* | 5/2015 | Cochran | H04W 4/21 705/14.58 |
| 2015/0161375 A1* | 6/2015 | Ghosh | G06F 21/36 726/7 |

FOREIGN PATENT DOCUMENTS

| | | | | |
|---|---|---|---|---|
| WO | 2009/002972 A2 | 12/2008 | | |
| WO | WO-2009002972 A2 * | 12/2008 | ............. | G06Q 20/00 |
| WO | 2015/076278 A1 | 5/2015 | | |

OTHER PUBLICATIONS

Notification of Transmittal of the International Search Report and the Written Opinion of the International Searching Authority, or the Declaration for PCT/US2018/068152, dated Mar. 28, 2019, 12 pages.

Office Action issued in corresponding Japanese Patent Application No. 2020-536743, dated Jan. 6, 2023, with English translation.

* cited by examiner

IDENTIFYING CONSUMERS ONLINE FOR PROVIDING OFFERS AND COUPON VALIDATION ONLINE, IN REAL-TIME, AND AT THE POINT OF SALE

CROSS-REFERENCE TO RELATED APPLICATIONS

This application claims priority under 35 U.S.C. § 120 as a continuation of, U.S. patent application Ser. No. 16/237,007, entitled "IDENTIFYING CONSUMERS ONLINE FOR PROVIDING OFFERS AND COUPON VALIDATION ONLINE, IN REAL-TIME, AND AT THE POINT OF SALE," to Kevin Hunter et al., filed on Dec. 31, 2018, which claims priority under 35 U.S.C. § 119(e), to U.S. Provisional Patent Application No. 62/612,934, entitled "IDENTIFYING SHOPPERS ON LINE," to Joshua Herzig-Marx, Kevin Hunter, and Benjamin S. Sprecher, filed on Jan. 2, 2018, to U.S. Provisional Patent Application No. 62/613,347, entitled "REAL-TIME, REMOTE VALIDATION OF ADDED VALUE CERTIFICATES," to Joshua Herzig-Marx and Benjamin S. Sprecher, filed on Jan. 3, 2018, and to U.S. Provisional Patent Application No. 62/613,344, entitled "REAL-TIME, POINT OF SALE CONSUMER REBATES," to Mark Bees and Benjamin S. Sprecher, filed on Jan. 3, 2018, the contents of all of the above applications are herein incorporated by reference in their entirety, for all purposes.

BACKGROUND

Field

The present disclosure generally relates to identifying a consumer through a remote server for providing an offer from a retailer to consumer. More specifically, the present disclosure relates to methods and devices for providing a personalized offer to a consumer after identifying consumer based on information provided by consumer, the information including a purchasing history of consumer. The present disclosure also relates to consumer interactions at a point of sale (POS), more specifically to methods and devices for verifying and applying a consumer rebate for a consumer at a POS.

Description of the Related Art

Consumer identification protocols typically involve a request for a consumer to provide a password, ID value, or any other authentication credential that is hard to access or unavailable for consumer in some circumstances. The more difficult it is for a consumer to access a certain account or service, the less likely it is for consumer to return to the website for the service, or to respond to a request or offer for service.

In addition, current consumer rebate strategies involve post-transaction verification with a physical receipt, or another proof of purchase available to consumer. Users fill in a receipt including proof of purchase to receive, later on, the rebate. In some embodiments, these time-consuming post-transaction verification steps are avoided through direct communication between the rebate grantor and the POS, or accessing a loyalty system binding a consumer to a brand or a retail store. The POS authenticates an actual transaction tying consumer with a rebate product, and the rebate grantor approves and processes the rebate thereafter, separately from the POS. However, these configurations still require a two-way communication between the POS and a server in communication with the rebate grantor, or accessing, by the server in communication with the rebate grantor, a loyalty account for consumer, where the details of every transaction may be stored. This process is time consuming, as it is generally asynchronous with respect to the presence of consumer at the POS at the time of purchase. However, consumers find it more convenient to receive rebates as close in time to the purchasing event as possible.

Current applications enable vendors to provide tickets and other certificates to the smart phones of users and consumers that third party vendors can verify on location. These certificates are validated using two-way systems requiring communication between a third party device and a remote server, for authorization. In such configurations, an application installed in the smart phone and hosted by the remote server is the validation engine, and the third party device is the origin and destination of the validation process (e.g., the "gate keeper"). While some of these applications provide an effective protection against counterfeits, they typically take a longer time, and involve the modification not only of the remote server, but also of the third party devices.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

SUMMARY

Figure 1:
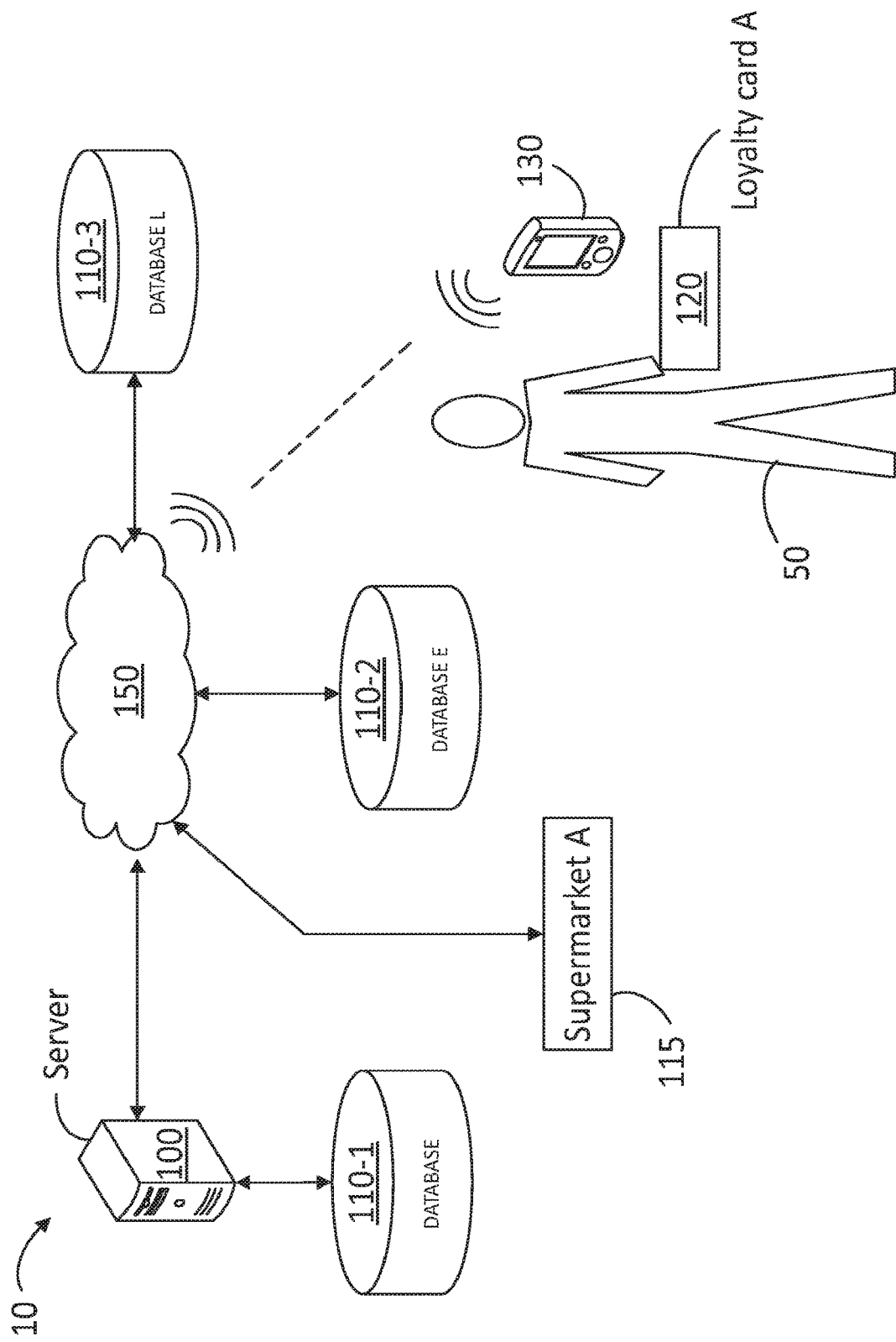
FIG. 1 illustrates an example architecture suitable for identifying consumers online, according to some embodiments.

In a first embodiment, a computer-implemented method is disclosed that includes receiving, from a consumer, a client device identification though an application running in a client device. The computer-implemented method includes matching client device 130 identification with a loyalty card for a retail store, identifying a shopping history for consumer, associated with the retail store, in a database, based on the loyalty card, and requesting, through the application, an information from consumer, based on the shopping history. The computer-implemented method also includes verifying the identity of consumer when at least a portion of the information matches the shopping history associated with the retail store, for consumer, and providing an offer to consumer, through the application running in the client device, of a product in the retail store.

In a second embodiment, a system is disclosed that includes a memory storing instructions, and one or more processors configured to execute the instructions to receive, from a consumer, a client device identification though an application running in a client device. The one or more processors also execute instructions to match client device 130 identification with a loyalty card for a retail store, to identify a shopping history for consumer, associated with the retail store, in a database, based on the loyalty card, and to request, through the application, an information from consumer, based on the shopping history. The one or more processors also execute instructions to verify an identity of consumer when at least a portion of the information matches the shopping history associated with the retail store, for consumer, and to provide an offer to consumer, through the application running in the client device, of a product in the retail store.

In a third embodiment, a computer-implemented method is disclosed that includes identifying, at a remote server, a consumer at a point of sale location, wherein consumer checks out multiple products in a shopping basket. The computer-implemented method also includes informing consumer that a rebate is due on at least one product from the shopping basket, and instructing a network terminal to provide a valid rebate voucher for the at least one product, to consumer. The computer-implemented method also includes providing a running total of earned rebates and points for display in an application run in a client device used by consumer, and communicating to consumer whether the rebate has been credited to a consumer account accessible to the remote server.

In yet other embodiment, a system is disclosed that includes a means for storing instructions, and a means for executing the instructions to cause the system to receive, from a consumer, a client device identification though an application running in a client device. The means for executing the instructions further executes the instructions to match client device 130 identification with a loyalty card for a retail store, to identify a shopping history for consumer, associated with the retail store, in a database, based on the loyalty card, and to request, through the application, an information from consumer, based on the shopping history. The means for executing instructions also executes instructions to verify an identity of consumer when at least a portion of the information matches the shopping history associated with the retail store, for consumer, and to provide an offer to consumer, through the application running in the client device, of a product in the retail store.

In a further embodiment, a computer-implemented method is disclosed that includes receiving, in a remote server, a request for validating an added value certificate from a consumer and receiving, in the remote server, an information for a location associated with consumer. The computer-implemented method also includes validating the added value certificate, and instructing a network terminal to provide the validated added value certification at the location associated with consumer. The computer-implemented method also includes instructing the network terminal to provide an error message for consumer at the location, when the added value certificate is invalid.

In yet another embodiment, a computer-implemented method is disclosed that includes requesting, to a remote server, a validation of an added value certificate and providing, to the remote server, an information for a consumer location. The computer-implemented method also includes receiving the validated added value certificate as a printout or display from a network terminal in consumer location, or in a client device form the remote server.

DETAILED DESCRIPTION

In the following detailed description, numerous specific details are set forth to provide a full understanding of the present disclosure. It will be apparent, however, to one ordinarily skilled in the art that embodiments of the present disclosure may be practiced without some of these specific details. In other instances, well-known structures and techniques have not been shown in detail so as not to obscure the disclosure.

General Overview

Although many examples provided herein describe a user's down-streaming activity being identifiable, each user may grant explicit permission for such user information to be shared or stored. The explicit permission may be granted using privacy controls integrated into the disclosed system. Each user may be provided notice that such user information will be shared with explicit consent, and each user may at any time terminate the information sharing, and may delete any stored user information. The stored user information may be encrypted to protect user security.

A network service provider as disclosed herein may desire that consumers who engage with a digital advertising be identified with a retailer shopper ID (e.g., a "consumer loyalty card"). To achieve a high level of certainty with which a retailer or a network service provided feel comfortable, several hurdles need to be overcome. On the one hand, no matter how many databases are cross-examined, there is always the possibility of misidentification of the person holding a client device and purporting to be consumer associated with a given loyalty card. On the other hand, automatically linking a client device identification (ID) for a consumer to a retail shopper ID for pushing advertisements (e.g., using a well-established third party database) may startle consumer ("How did that ad know that my Generic Store club card ID is 123456?!"), prompting a negative reaction. Furthermore, requesting that a consumer accurately enter a loyalty card ID for an advertisement introduces a likely insurmountable friction ("What's my Generic Store club card ID? 12654?") with consumer.

Embodiments as disclosed herein include methods and devices to resolve the above problems which arise in the realm of computer technology and mobile network devices.

Accordingly, embodiments as disclosed herein provide a low friction and highly effective method for pushing advertisements and offers from retailers to a consumer, making consumer a conscious participant of the transaction without demanding too much concentration or effort to provide critical information. Systems and methods as disclosed herein are able to determine consumer ID with a high degree of accuracy by combining information from the retailer and from third party identification databases. Specifically, embodiments as disclosed herein retrieve from the retailer a detailed consumer history that can be matched with information requested from consumer. Accordingly, since it is highly probable that only consumer will know certain items of information in consumer history provided by the retailer, a verbal confirmation from consumer has a high degree of likelihood for a positive consumer ID.

Embodiments as disclosed herein include methods and devices to deliver value to a consumer according to a rebate offer that is redeemable digitally without the need to communicate with the existing POS or existing loyalty platform on the retailer end. Accordingly, embodiments as disclosed herein associate transactional data from the POS with a consumer that has selected rebate offers for certain products or brands. In some embodiments, the user selects and saves the rebate offers through a wallet app in a smartphone or other mobile client device. The system is then able to present the rebate to consumer at the POS, in real-time, while consumer is at cashier.

Accordingly, embodiments as disclosed herein provide a direct link to consumer that bypasses a POS device and any loyalty system or network linking consumer with the retailer or brand name associated with the rebate. Embodiments consistent with the present disclosure provide the convenience and simplicity of in-transaction rebates without the complexity of the POS system and the loyalty system. In some embodiments, systems as disclosed herein include real-time access to monitor transaction activity in the POS. Accordingly, a system as disclosed herein may remotely access information from the POS device without the need to request the information, or the need to wait for the POS device to provide the information. Thus, the system may be able to process the validation of the transaction against a rebate offer associated with the transaction customer in real time. In some embodiments, the latency of the rebate validation process may be governed by business policy rather than technology. Examples of POS devices may include, without limitation, a cash register machine at a cashier line, wherein the cash register machine may further include a scanning device (e.g., a barcode scanner, a radio-frequency identification—RFID—device, and the like) that the cashier may use to identify a price tag associated with a product in consumer shopping basket (e.g., a barcode scanner a radio-frequency identification—RFID—device, and the like). Accordingly, the POS device may be configured to access a remote server through the network, independently from consumer, who may also access the remote server through the network via a client device.

FIG. 1 illustrates a system 10 configured to identify consumers online through a remote server 100. A consumer 50 may have a loyalty card 120 associated with a retailer 115 (e.g., Supermarket A). The consumer and retailer 115 may be registered with the server, and may access the server through a network. A connection to the network is provided, in the case of consumer 50, by a client device, which may include any type of mobile computer appliance that may wirelessly communicate with the server through the network. The server may handle a database 110-1 that includes service accounts, for consumer 50 and for retailer 115. Accordingly, the server may also store in database 110-1 a consumer ID, including personal data such as a consumer history, consumer 50 identification being associated with a network identification of client device 130 (e.g., a cell phone number, when client device 130 is a smart phone). The consumer history in database 110-1 may include a specific history of consumer purchases with retailer 115. In some embodiments, consumer 50 history with retailer 115 may be associated with an account for retailer 115 in the database, rather than with an account for consumer 50. In some embodiments the account for consumer 50 and the account for retailer 115 may be linked to each other in the database, e.g., through consumer 50 history.

The server may also have access to other consumer databases, e.g., database 110-2 and database 110-3, through the network. Hereinafter, databases 110-1, 110-2 and 110-3 will be collectively referred to as "databases 110." Accordingly, the server may be configured to push certain targeted advertisements and offers to consumer 50 (e.g., a digital advertisement), the advertisements and offers associated with products in stores associated with retailer 115. Responsive to the advertisement pushed by the server, consumer 50 may request access to the product, or the offer or coupon associated with the product. In response, the server desirably acquires full, or almost full, certitude of the true identity of consumer 50 by requesting personal information based on consumer 50 history with retailer 115. This ensures maximum impact of the targeted advertisements and offers, protects the privacy of consumer 50, and also protects any value offered by retailer 115 in the target advertisement or offer. In some embodiments, it is consumer 50 that may request the server for advertisements, offers, and other benefits associated with retailer 115.

In some embodiments, an advertisement that is pushed to a consumer by the server for retailer 115 may include a request to verify an ID of consumer 50 by answering simple questions. The questions may include requests for information about past purchases. To consumer 50, these requests may feel non-invasive and easy to answer correctly (when consumer 50 is the correct match to consumer 50 history provided by retailer 115). Some exemplary questions that the server may push onto consumer 50 through client device 130 may include:

Which product have you our your family purchased within the past two months at a retailer 115 store?
  (a) milk (a very common product that consumer 50 will easily know they purchased);
  (b) Godiva Mini Indulgences Ice Cream Sandwiches (a very specific product that consumer 50 associated with client device 130 has never purchased, and from a category consumer 50 has never shopped, according to consumer 50 history provided by retailer 115); or
  (c) Angry Orchards Gluten Free Cranberry Peach Hard Cider (another very specific product consumer 50 has never purchased, from a category they have never shopped).

In some embodiments, the server may push one or more questions to consumer 50, depending on conversion ratios of each step (e.g., whether or not consumers tend to give correct answers at the first, second, or third questions, and the like). Upon selecting the correct answers, or at least one correct answer to multiple questions, consumer 50 will believe that we have carefully calculated their identity based on differential analysis of buying patterns. The format of the questions posed to consumer 50 may be multiple-choice questions, or fill-in the blank questions, or provide a text input questions. In some embodiments, the questions may be designed to elicit a response from consumer 50 that may indicate certain demographic group to which the user belongs (e.g., age—when the advertised product is an alcoholic product—).

Figure 2:
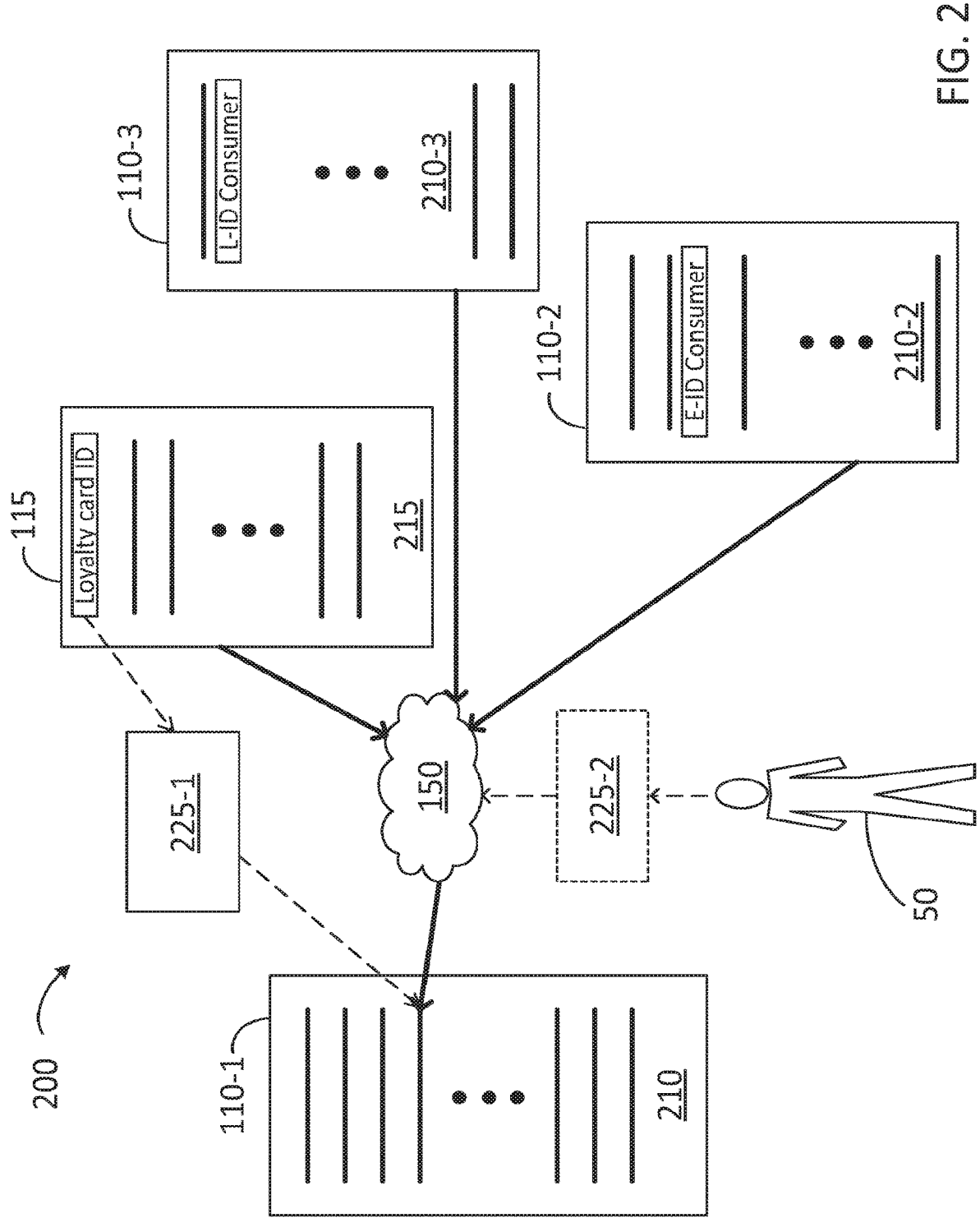
FIG. 2 illustrates an information exchange for identifying consumers online, according to some embodiments.

FIG. 2 illustrates an information exchange scheme 200 between consumer 50, a retailer 115, and databases 110, according to some embodiments. Accordingly, each of databases 110, the server database, and database 215 of retailer 115, may have a specific consumer identity associated with the network ID of client device 130. The network ID of client device 130 is passed through every network hub and device that communicates with the client device, including those installed with the server, with retailer 115, and with the servers hosting databases 110-2 and 110-3. For example, database 110-2 may include a list 210-2 of E-type consumer IDs, and database 110-3 may include a list 210-3 of L-type consumer IDs. Due to multiple imperfections in the data collection system of this heterogeneous network of databases and players, there is a degree of mismatch and uncertainty in consumer 50 identification when consumer 50 itself is removed from the process. Such uncertainty and inaccuracies are especially prevalent in consumer 50 market arena, where consumers may provide incorrect, incomplete, inaccurate, or different information to databases 110-2, 110-3, retailer 115, and even the remote server database 110-1. Accordingly, there is a degree of uncertainty that all the information in each of the multiple players in FIG. 2 converges down to one true person: consumer 50.

To fully verify the identity of consumer 50, in some embodiments, the server uses a consumer history 225-1 for retailer 115 associated with an ID of client device 130. Accordingly, the server may ask consumer 50 directly one or more specific questions associated with consumer history 225-1 in retailer 115. In some embodiments, a consumer history 225-2 may be associated with any retailer, other than retailer 115, and still be useful to the remote server to establish the ID of consumer 50. Hereinafter, consumer histories 225-1 and 225-2 will be collectively referred to as "consumer history 225." When consumer 50 responds correctly a certain portion of the questions, the server may certify the identity of consumer 50. Thereafter, the server may push advertisements and offers for products in retailer 115 to consumer 50.

Figure 3:
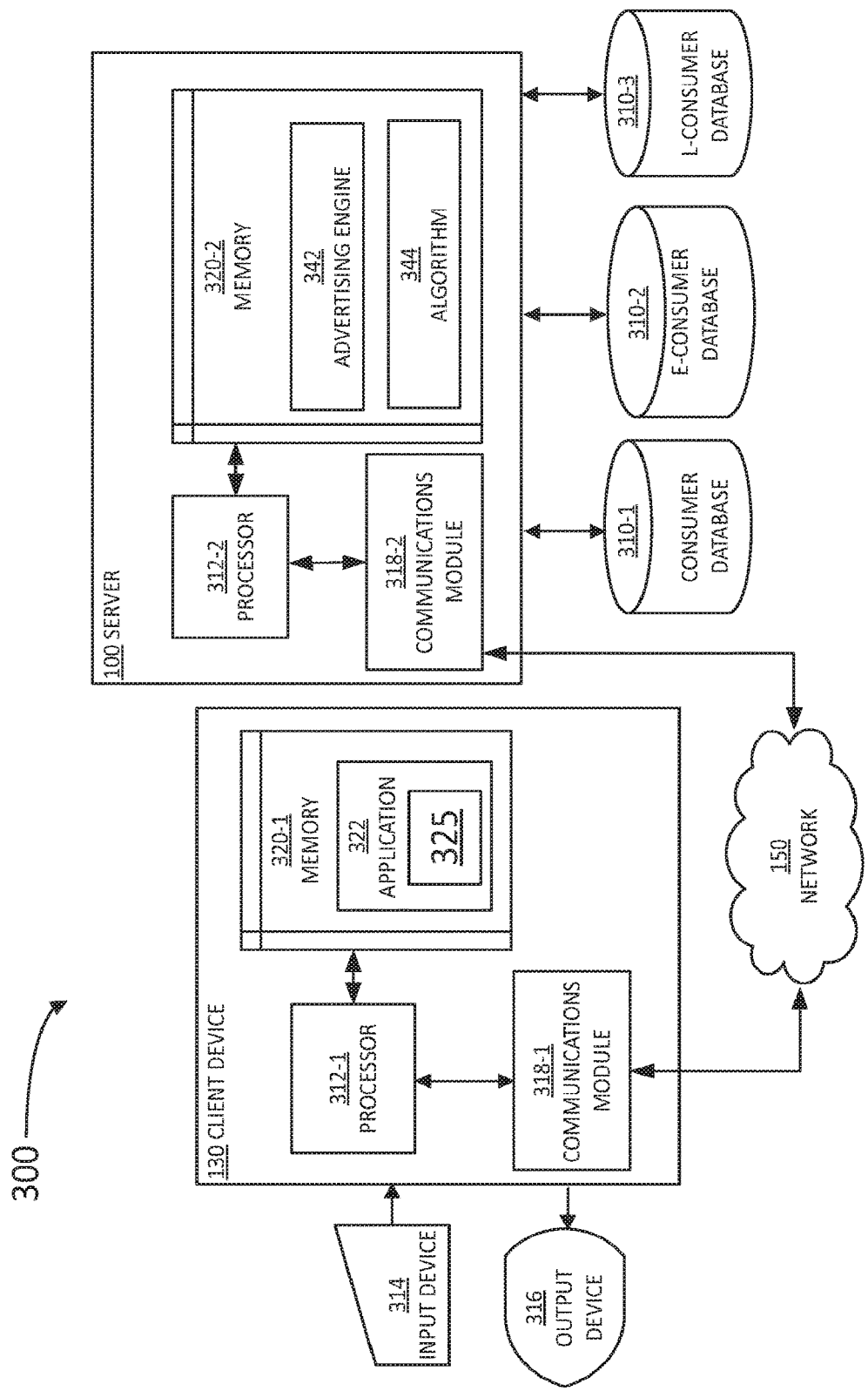
FIG. 3 is a block diagram illustrating an example server and a client from the architecture of FIG. 1, according to some embodiments.

FIG. 3 is a block diagram 300 illustrating an example server 100 and client device 130 in the architecture 100 of FIG. 1, according to certain aspects of the disclosure. Client device 130 and server 100 are communicatively coupled over network 150 via respective communications modules 318-1 and 318-2 (hereinafter, collectively referred to as "communications modules 318"). Communications modules 318 are configured to interface with network 150 to send and receive information, such as data, requests, responses, and commands to other devices on the network. Communications modules 318 can be, for example, modems or Ethernet cards. Client device 130 may be coupled with an input device 314 and with an output device 316. Input device 314 may include a keyboard, a mouse, a pointer, or even a touch-screen display that a user (e.g., a consumer) may utilize to interact with client device 130. Likewise, output device 316 may include a display and a speaker with which the user may retrieve results from client device 130. Client device 130 may also include a processor 312-1, configured to execute instructions stored in a memory 320-1, and to cause client device 130 to perform at least some of the steps in methods consistent with the present disclosure. Memory 320-1 may further include an application 322 including specific instructions which, when executed by processor 312-1, cause an advertisement payload 325 from server 100 to be displayed for consumer 50. Advertisement payload 325 may include multiple digital promotions or coupons presented to consumer 50 by server 100, and consumer 50 may store at least some of the digital promotions or coupons from advertisement payload 325 in memory 320-1.

Server 100 includes a memory 320-2, a processor 312-2, and communications module 318-2. Processor 312-2 is configured to execute instructions, such as instructions physically coded into processor 312-2, instructions received from software in memory 320-2, or a combination of both. Memory 320-2 includes an advertisement engine 342 for integrating images, videos, and other multimedia files into advertisement payload 325. Advertisement engine 342 may push advertisements to a user of client device 130 that is a consumer of a retailer store (e.g., retailer 115) or chain of stores through application 322 or a web browser installed in client device 130. Accordingly, application 322 may be installed by server 100 and perform scripts and other routines provided by server 100. In some embodiments, application 322 may be configured to display advertisement payload 325 provided by advertisement engine 342. Hereinafter, processors 312-1 and 312-2, and memories 320-1 and 320-2 will be collectively referred to as "processors 312" and "memories 320," respectively.

Block diagram 300 includes consumer database 310-1, E-consumer database 310-2, and L-consumer database 310-3 (hereinafter, collectively referred to as "consumer databases 310"). Consumer databases 310 may be associated to different retailers or services to which consumer 50 subscribes to, or is a member of. An algorithm 344 in memory 320-2 stores commands which, when executed by processor 320-2, cause server 100 to correlate databases 310 to find one or more IDs associated with the same consumer 50 that is uploading or interacting with advertisement payload 325 through application 322 in client device 130. Algorithm 344 may include a neural network (NN) trained over databases 310.

Figure 4:
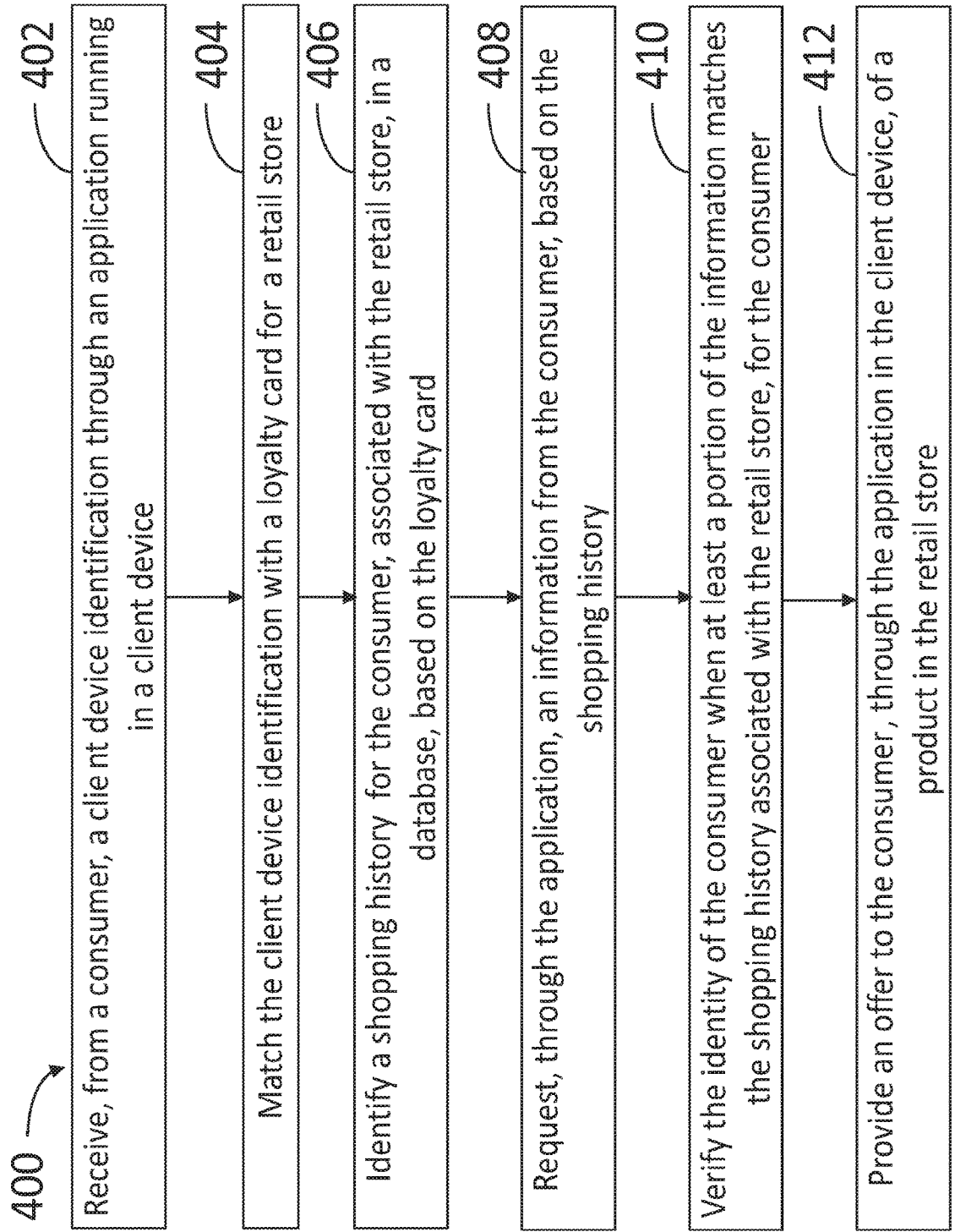
FIG. 4 is a flow chart illustrating steps in a method for identifying a consumer online, according to some embodiments.

FIG. 4 is a flow chart illustrating steps in a method 400 for identifying a consumer online, according to some embodiments. In some embodiments, at least one or more of the steps in method 400 may be partially or fully performed by a computer device including a processor, a memory, and a communications module (e.g., client device 130, server 100, processors 312, memories 320, and communications modules 318). The communications modules may enable the computer devices to communicate with each other through a network (e.g., network 150). The processors may execute instructions stored as an application or an algorithm in the memories, to perform at least some of the steps in method 400 (e.g., application 322 and algorithm 344). In some embodiments, the memories in method 400 may include external databases accessible to the computer device via the network (e.g., databases 310).

Embodiments consistent with the present disclosure may include methods having at least one step similar to any of the steps in method 400. Furthermore, methods consistent with the present disclosure may include any of the steps in method 400 performed in any order. For example, in some embodiments a method as disclosed herein may include at least one or more of the steps in method 400 performed in reverse order, simultaneously, almost simultaneously, or overlapping in time.

Step 402 includes receiving, from a consumer, a client device identification through the application running in the client device. In some embodiments, step 402 includes providing to consumer 50, through the application in the client device, an advertisement for the product in the retail store before receiving client device identification. In some embodiments, step 402 includes receiving, from consumer 50, a second client device identification from a second client device associated with a same loyalty card for the retail store.

Step 404 includes matching client device identification with a loyalty card for a retail store.

Step 406 includes identifying a shopping history for consumer 50, the shopping history associated with the retail store, in a database, based on the loyalty card. In some embodiments, step 406 the shopping history is associated with multiple retail stores and services, and step 406 includes querying consumer 50 about multiple items purchased in the retail stores or services.

Step 408 includes requesting, through the application, an information from consumer 50, based on the shopping history. In some embodiments, step 408 includes querying consumer 50 about one or more items in the shopping history.

Step 410 includes verifying the identity of consumer 50 when at least a portion of the information matches the shopping history associated with the retail store, for consumer 50. In some embodiments, step 410 includes performing a differential analysis of buying patterns for consumer 50 based on the shopping history. In some embodiments, step 410 includes correlating client device identification with multiple databases associated with multiple retail stores. In some embodiments, step 410 includes mapping the identity of consumer 50 to client device identification and storing a map including client device identification in a database. In some embodiments, step 410 includes verifying that consumer 50 provides at least one correct answer to multiple questions based on the shopping history.

Step 412 includes providing an offer to consumer 50, through the application in the client devices, of a product in the retail store. In some embodiments, step 412 includes applying the offer to consumer 50 when consumer 50 purchases the product in the retail store.

Figure 5:
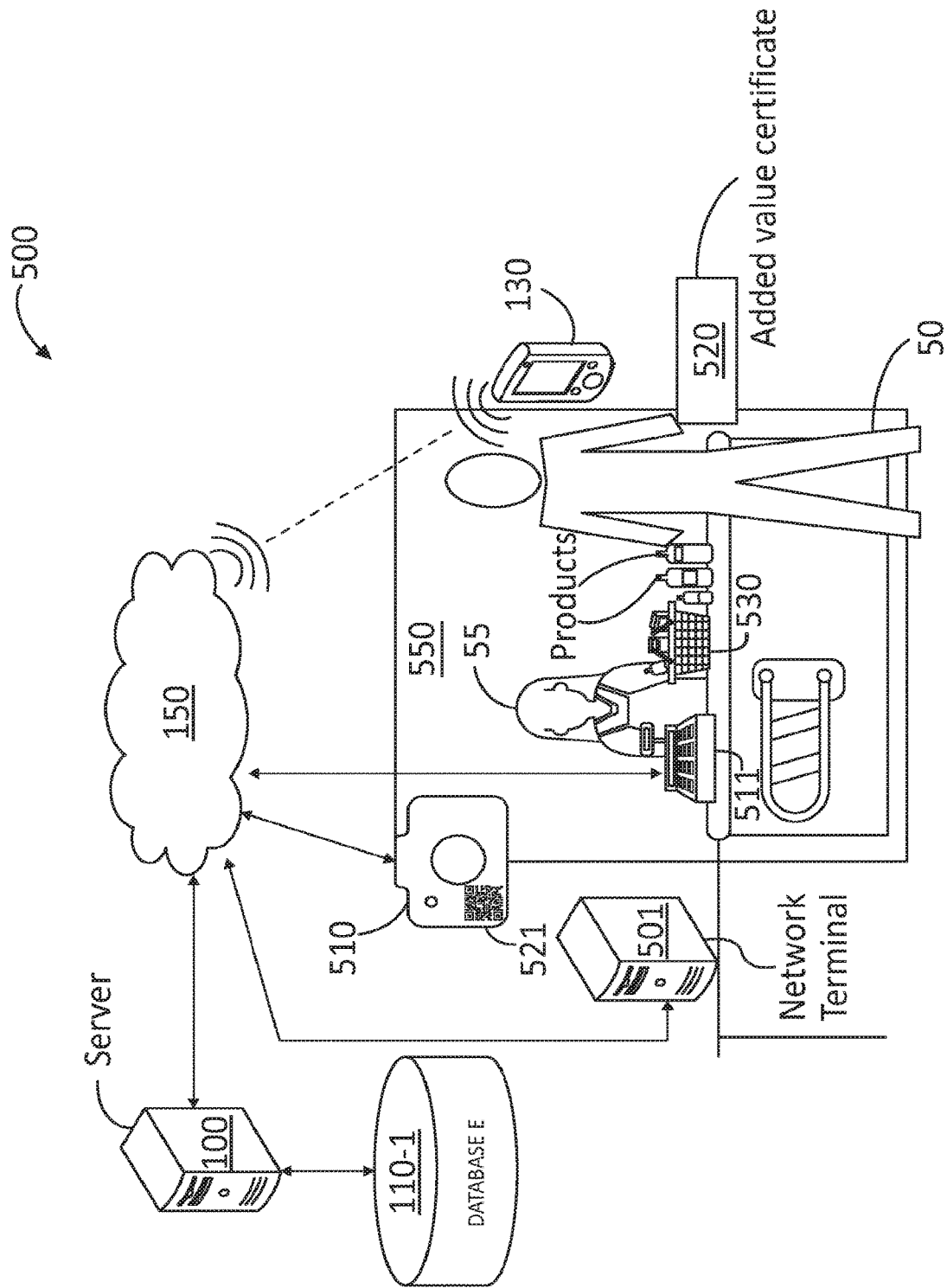
FIG. 5 illustrates a system configured to provide a real-time, POS consumer rebate, according to some embodiments.

FIG. 5 illustrates a system 500 configured to provide a real-time, POS consumer rebate. Consumer 50 stands in front of a POS 550 with a shopping basket 530 containing products selected by consumer 50. A cashier 55 scans each of the products in shopping basket 530 using a POS device 511, which is communicatively coupled with remote server 100 via network 150 (e.g., through an Ethernet link, an optical link, a wireless link, a cellular network, and the like). Accordingly, remote server 100 may have direct access to a list of the products in shopping basket 530, as they are scanned by the cashier. In addition to POS device 511, POS 550 may also include a network terminal 501 and an identification (ID) device 510 having a POS ID 521. Remote server 100 verifies consumer 50 identity and location by accessing database 110-1 that includes information about consumer 50, an added value certificate 520 handled by consumer 50 (e.g., a coupon, a rebate offer, and the like), and the retail store associated with POS 550 (e.g., retailer 115). Network terminal 501 may be communicatively coupled with ID device 510 and with remote server 100 via network 150 (e.g., through an Ethernet link, an optical link, a wireless link, a cellular network, and the like). In that regard, in some embodiments network terminal 501 and ID device 510 may be directly coupled with remote server 100, separately from POS device 511. In some embodiments, network terminal 501 and ID device 510 may be also coupled with POS device 511. Accordingly, in some embodiments network terminal 501 includes a printer configured to print a validated certificate to consumer 50. In some embodiments, network terminal 501 includes a secondary display configured to display a validated certificate for consumer 50, or a validation token for the certificate handed by consumer 50.

The ID device 510 may include a camera or any other sensor configured to detect and identify consumer 50 as consumer 50 stands or moves across POS 550. The POS ID may include a quad code, a barcode, a Rivest-Shamir-Adelman (RSA) code, and the like, that identifies POS 550 (e.g., the shopping line). In some embodiments, POS ID 521 is time varying, according to a pre-selected pattern. Thus, when the customer is performing the transaction, he/she may take a picture of POS ID 521 with a client device and provide the picture to the remote server through the network (e.g., through a cellular network, a WiFi network, or any other wireless network), the remote server is able to determine when and where (e.g., on which line) the customer is located at POS 550, performing the transaction. In some embodiments, client device 130 has an application that is hosted by the remote server.

With the information from the client device, and the shopping list scanned by the cashier 55 with POS device 511, the remote server is able to establish with confidence (e.g., within a few minutes, given the time resolution of POS ID 521) that a rebate for at least one or more of the products in the shopping basket is due to the customer. The rebates may then be applied from the server to POS 550, or credited to the user account.

In some embodiments, ID device 510 may include any combination of biomarker sensors in addition to picture, such as voice, fingerprint, and the like. For example, ID device 510 may include Wi-Fi repeaters (listening and broadcasting) generating a row of signals. Moreover, in some embodiments ID device 510 is configured to identify consumer 50 through the client device. Accordingly, ID device 510 may wirelessly communicate with client device 130 to request ID information about consumer 50. In some embodiments ID device 510 may include proximity detectors to detect client device 130 or other wearable devices, and determine the presence of consumer 50 at the line identified by POS ID 521. Some of the wireless identification techniques between ID device 510 and client device 130 or other wearable devices worn by consumer 50 may include different types and combinations of acoustic communication: supersonic, subsonic, or audible. In some embodiments, the remote server may determine the precise location and timing of consumer 50 (e.g., which POS line and at what time) by triangulating or multiplexing different types of signals from different sensors in the store or the vicinity of POS 550 (e.g., sensor fusion).

In some embodiments, the remote server may associate the rebate and consumer 50 by collecting information about the payment method used by consumer 50 at POS 550 (e.g., debit or credit card). For example, a credit card server hosting a consumer account used by consumer 50 to pay for the shopping basket at POS 550 may provide the store transaction to the remote server. The remote server scans the report from the credit card server and compares it with a report received from POS device 511 listing the transactions occurred during a certain period of time, and the products that have been purchased. The remote server then pairs the credit card holder to a specific transaction at POS 550, and determines, based on the transaction, whether a rebate is due to consumer 50.

In some embodiments, the remote server may infer the association between consumer 50 and the transaction involving a product on rebate by inference. Accordingly consumer 50 may use an application installed in client device 130 by the remote server, to register each of the products in the shopping basket, or at least the items subject to a rebate. When consumer 50 checks out at POS 550, the remote server may correlate the shopping basket received directly from consumer 50 through the application, and at least one shopping basket scanned at POS 550. Thus, the remote server may determine which lane the user is located and at what time, to apply and validate rebates.

In some embodiments, associating consumer 50 to a transaction including a specific shopping basket may include a direct communication between the remote server and consumer 50. For example, in some embodiments when a consumer is detected (e.g., via a proximity sensor, a motion sensor, and the like) near POS 550, the remote server requests from consumer 50 via client device 130 to confirm their specific location (e.g., in which lane). In some embodiments, ID device 510 at POS 550 may be a camera that takes a picture of consumer 50. The consumer may also take a picture of the receipt with client device 130 (showing a total dollar amount of the transaction). The remote server may compare consumer 50 receipt with more detailed transaction data obtained through the network coupling between POS device 511 and the remote server, using the total amount in the user receipt. In some embodiments, the remote server may include, after comparing consumer 50 data with data from POS device 511, a few more security screening questions to consumer 50 via the client device. For example, in some embodiments the remote server may ask consumer 50 more detailed questions about the shopping basket, e.g., "which of the following four other items did you buy together with the rebate article?" The remote server then validates the association between consumer 50 and a transaction for the rebate product.

When the remote server verifies that consumer 50 is entitled to a rebate the remote server may print a rebate receipt at network terminal 501 for consumer 50 at checkout. In some embodiments, the remote server prints out a "real" check for consumer 50 at network terminal 501. In some embodiments, the remote server prints a voucher redeemable at POS 550 in the same transaction, or in a future transaction. In that regard, the printed voucher may stay with consumer 50 or may be used by the cashier as part of payment. With the voucher, the remote server may credit a consumer account in the rebate amount. In some embodiments, the remote server may provide the rebate funds to POS 550 at the transaction point before closure of the transaction event. In yet other embodiments, the remote server may credit the rebate amount to a credit card holder for consumer 50 with which the remote server has an account, through the network. In some embodiments, the remote server may inform a brand application installed in client device 130 that they are responsible to credit consumer 50 in the rebate amount. Further, in some embodiments the remote server pushes rebate payment through a network based payment service or application to which consumer 50 has subscribed through the client device.

Figure 6:
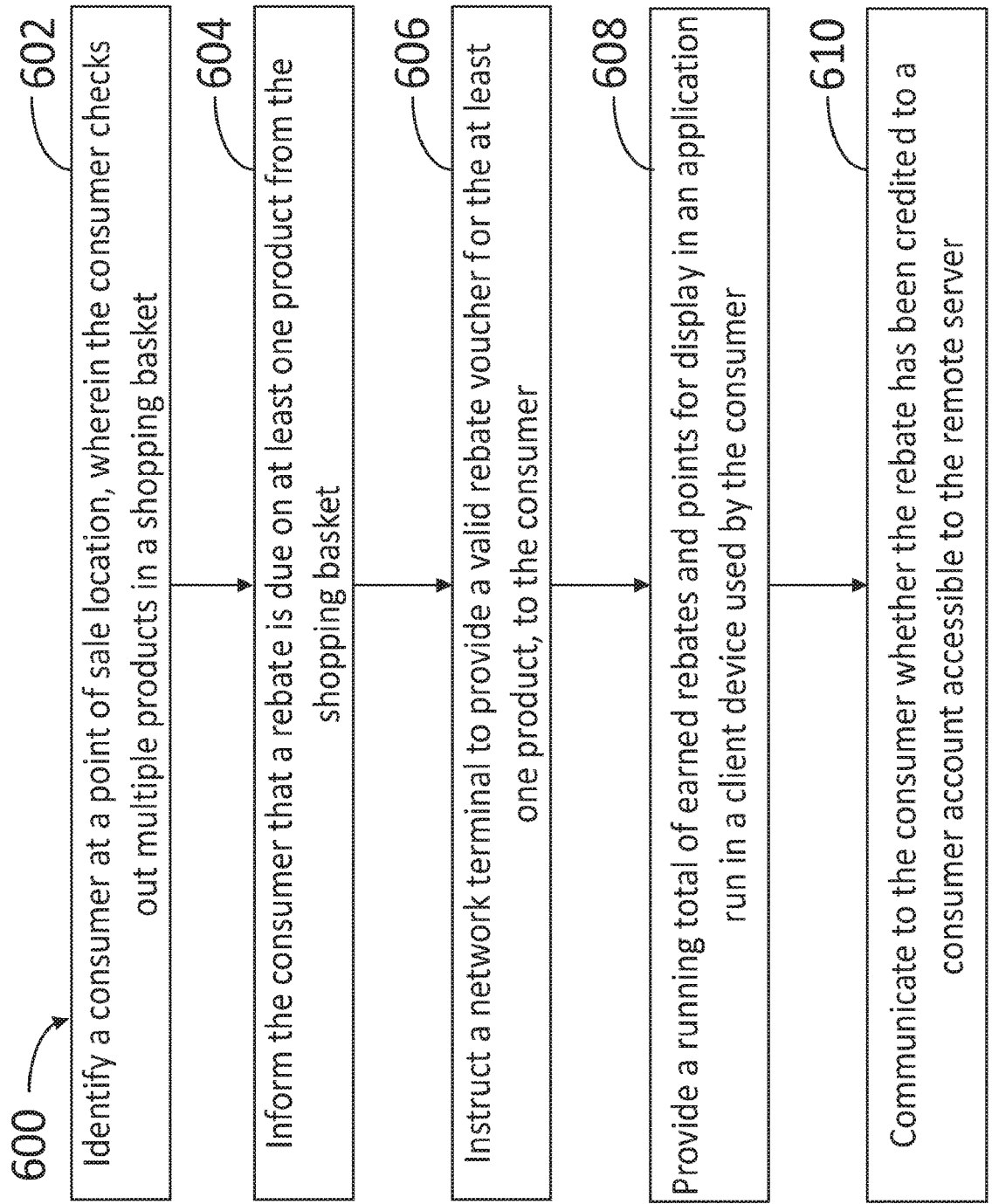
FIG. 6 is a flow chart illustrating steps in a method for identifying and applying real-time, point of sale consumer rebates at a POS through a remote server, according to some embodiments.

FIG. 6 illustrates steps in a method 600 for identifying and applying real-time, point of sale consumer rebates at a POS through a remote server. In some embodiments, at least one or more of the steps in method 600 may be partially or fully performed by a computer device including a processor, a memory, and a communications module (e.g., client device 130, server 100, processors 312, memories 320, and communications modules 318). The communications modules may enable the computer devices to communicate with each other through a network (e.g., network 150). The processors may execute instructions stored as an application or an algorithm in the memories, to perform at least some of the steps in method 600 (e.g., application 322 and algorithm 344). In some embodiments, the memories in method 600 may include external databases accessible to the computer device via the network (e.g., databases 310).

In some embodiments, method 600 may include a consumer logging into a retail store application installed in the client device and selecting a rebate, or an offer ($1 off of a 12-pack of COKE). The retail store application communicates to the remote server that the consumer has selected the rebate. In some embodiments, the retail store application provides an identification of the consumer to the remote server (e.g., a number at the "Stop and Shop" card number serviced by the retail store application). The remote server may store the rebate or offer as reported by the retail store application in the database, for future use when consumer is identified at a specific store purchasing the rebate product. Embodiments consistent with the present disclosure may include methods having at least one step similar to any of the steps in method 600. Furthermore, methods consistent with the present disclosure may include any of the steps in method 600 performed in any order. For example, in some embodiments a method as disclosed herein may include at least one or more of the steps in method 600 performed in reverse order, simultaneously, almost simultaneously, or overlapping in time.

Step 602 includes identifying a consumer at a POS location, wherein the consumer checks out multiple products in a shopping basket. In some embodiments, step 602 includes identifying a scanning of the universal product code (UPC) for the rebate product with the POS device (e.g., identifying a 12-pack of coke). Further, in some embodiments step 602 includes identifying a scan of the consumer Stop and Shop card and identifying the consumer. In some embodiments, step 602 includes correlating the multiple products checked out by a point of sale device at the point of sale location with an identity of the consumer at the point of sale location.

Step 604 includes informing the consumer that a rebate is due on at least one product from the shopping basket. In some embodiments, step 604 includes communicating to the consumer client device a reminder of an applicable rebate at the POS (e.g., the 12-pack coke rebate) when the remote server identifies the presence of the consumer at the POS, and the purchasing of the rebate product at the same or closely related times. In some embodiments, step 604 includes identifying the lane at the POS where the consumer is. For example, in some embodiments step 604 may include matching the consumer identification in the loyalty card presented at a POS with a rebate offer due to the consumer and stored in the remote server database.

Step 606 includes instructing the network terminal to provide a valid rebate voucher for at least one product. In some embodiments, step 606 may include instructing a printer coupled with the network terminal to print the valid rebate voucher for the at least one product.

Step 608 includes providing a running total of earned rebates and points for display in an application run in a consumer client device.

Step 610 includes communicating to the consumer whether the rebate has been credited to a consumer account accessible to the remote server. In some embodiments, step 610 may include choosing to immediately apply the rebate to the transaction or to credit the rebate for the transaction to the loyalty card account. In some embodiments, step 610 includes crediting the rebate to the consumer account after the consumer has purchased the at least one product.

Figure 7:
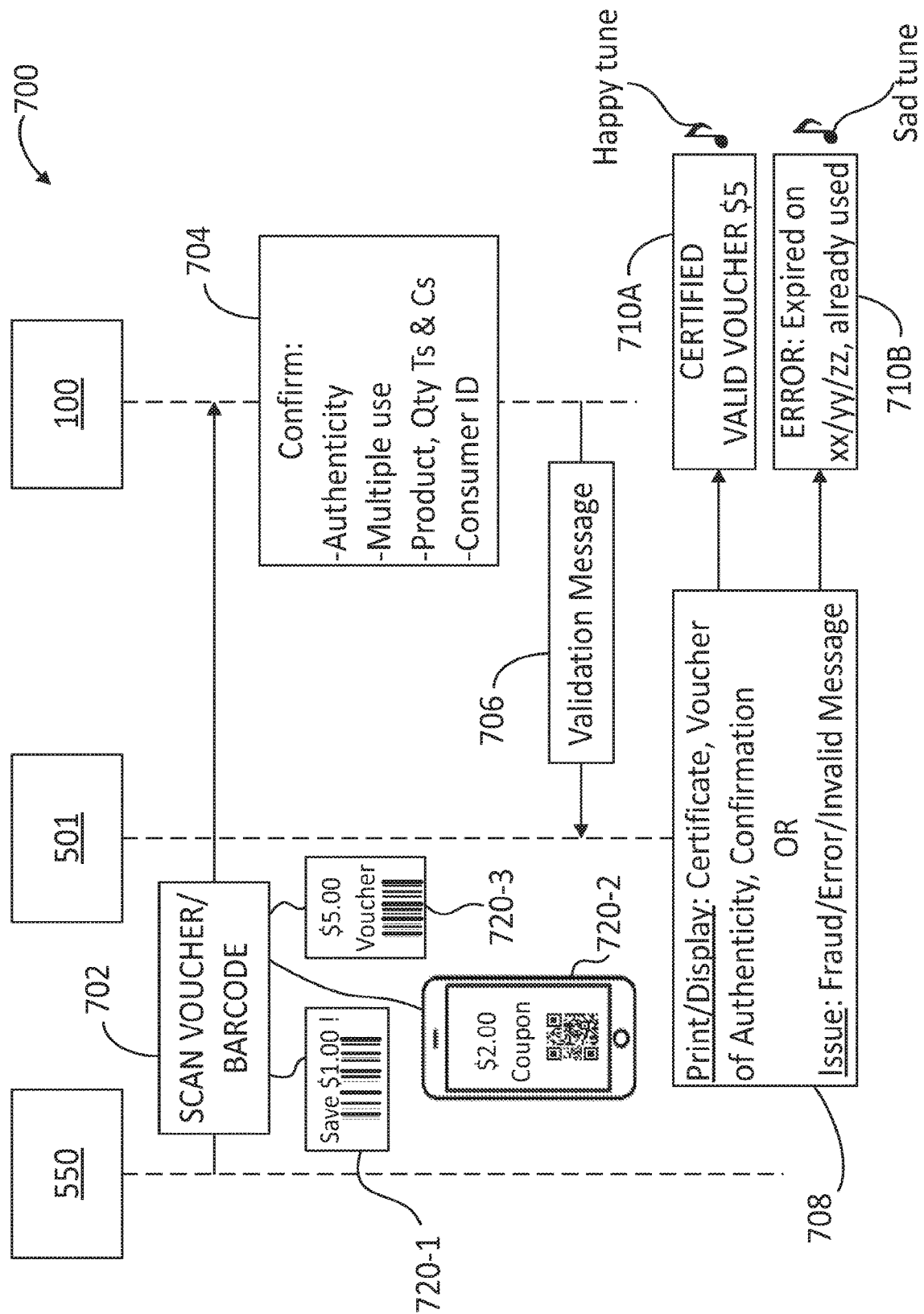
FIG. 7 illustrates steps in a method for real-time, remote validation of added value certificates, according to some embodiments.

FIG. 7 illustrates steps in a method 700 for real-time, remote validation of added value certificates (e.g., added value certificate 520). At POS 550, consumer 50 presents the added value certificate to the cashier, who scans it using the POS device (e.g., cashier 55 and POS device 511). An architecture to perform the illustrated method includes a device for reading a code (e.g., POS device 511), a central server for applying business rules, logic and validation (e.g. remote server 100) and an end point for conveying information as to what was the result of the business rules to consumer 50 (e.g., network terminal 501 communicatively coupled with remote server 100).

In some embodiments, consumer 50 may be enticed in step 702 to scan an added value certificate such as a coupon 720-1, a digital coupon 720-2, or a voucher 720-3 (hereinafter, collectively referred to as "added value certificates 720"). Added value certificates 720 may be part of a sweepstakes campaign from a retail store, e.g., a sign at the store may indicate that "the $1000^{th}$ person who scans a coupon (any coupon), is going to get a voucher printed worth One Thousand dls." The added value certificate may be a savings offer (e.g., save $1 in the purchase of certain product), a voucher (e.g., a $5.00 voucher), or a coupon displayed on a smartphone screen (e.g., a $2.00 coupon redeemable at the store). Remote server 100 has access to the scanned document through the network connection with the POS device. In some embodiments, the client device provides added value certificate 720 to remote server 100, for validation in addition to, or instead of, using a scanner in the POS device. Further, in some embodiments consumer 50 may provide added value certificate 720 to remote server 100, for validation, by presenting added value certificate 720 to the ID device (to capture an image of the added value certificate). In step 704, remote server 100 authenticates (confirms) added value certificate 720 by checking items such as: authenticity, multiple use, availability of a product associated with the certificate (e.g., quantity, location and the like), and terms, conditions and business rules associated with the certificate, and consumer 50 ID. In some embodiments, remote server 100 also identifies, in step 704, the location of consumer 50 based on information on consumer 50 obtained from POS 550 (e.g., the POS identification device) tying consumer 50 to the POS location at a given time.

In some embodiments, remote server 100 retrieves added value certificate 720 from consumer 50, at POS 550, an identification of the POS location (e.g., via the ID device), and the content of the shopping basket (e.g., from the POS device).

Upon validation, the remote server sends a validation message in step 706 to network terminal 501 (at the identified POS location). In some embodiments, the validation message may include a command to print, in step 708, an alert about an invalid certificate (sad tune, step 710B), or to print a validated certificate for consumer 50 (e.g., a certified voucher for $5.00 and the like, accompanied by a happy tune, step 710A). The printout is a solid affirmation of the status of consumer 50 certificate. In some embodiments, the validated certificate may be used at POS 550 by consumer 50. In case that the validation fails, remote server 100 may instruct the network terminal to print out a ticket indicating an error, and a reason for the error (e.g., certificate already used, or expired on such date, and the like). In some embodiments, the validated certificate may be sent to any other touch point to reach consumer 50, e.g., remote server 100 may provide a message to the client device: "the certificate expired three days ago."

Accordingly, embodiments as disclosed herein may identify fraudulent added value certificates without potentially involving the cashier in a dispute with consumer 50. More generally, in embodiments consistent with the present disclosure POS 550 is not configured to perform validation of added value certificates (e.g., vouchers, coupons, rebate offers and the like) issued by remote server 100. In some embodiments, remote server 100 may provide the authentication result to the vendor at POS 550, for the vendor to decide what it wants to do with the result (fraud/valid).

Figure 8:
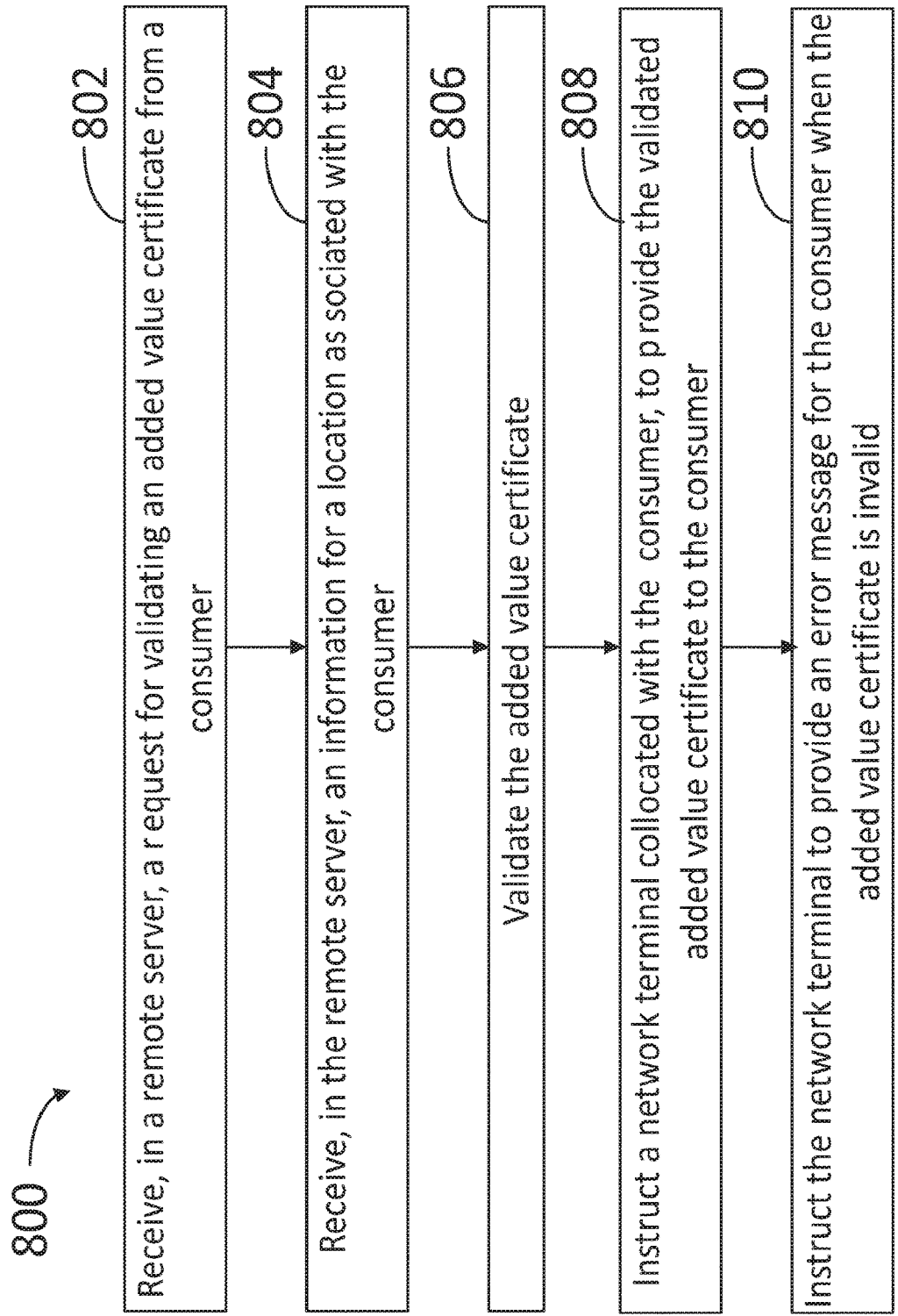
FIG. 8 is a flow chart illustrating steps in a method for providing real-time, point of sale validation of added value certificates, according to some embodiments.

FIG. 8 is a flow chart illustrating steps in a method 800 for providing real-time, point of sale validation of added value certificates (e.g., added value certificate 520), according to some embodiments. In some embodiments, at least one or more of the steps in method 800 may be partially or fully performed by a computer device including a processor, a memory, and a communications module (e.g., client device 130, server 100, processors 312, memories 320, and communications modules 318). The communications modules may enable the computer devices to communicate with each other through a network (e.g., network 150). The processors may execute instructions stored as an application or an algorithm in the memories, to perform at least some of the steps in method 800 (e.g., application 322 and algorithm 344). In some embodiments, the memories in method 800 may include external databases accessible to the computer device via the network (e.g., databases 310).

In some embodiments, method 800 may include a consumer logging into a retail store application installed in client device 130 and selecting a rebate, or an offer ($1 off of a 12-pack of COKE). The retail store application communicates to the remote server that the consumer has selected the rebate. In some embodiments, the retail store application provides an identification of the consumer to the remote server (e.g., a number at the "Stop and Shop" card number serviced by the retail store application). The remote server may store the rebate or offer as reported by the retail store application in the database for future use when the consumer is identified at a specific store purchasing the rebate product. Embodiments consistent with the present disclosure may include methods having at least one step similar to any of the steps in method 800. Furthermore, methods consistent with the present disclosure may include any of the steps in method 800 performed in any order. For example, in some embodiments a method as disclosed herein may include at least one or more of the steps in method 800 performed in reverse order, simultaneously, almost simultaneously, or overlapping in time.

Step 802 includes receiving, in a remote server, a request for validating an added value certificate from a consumer.

Step 804 includes receiving, in the remote, server, an information for a location associated with the consumer. In some embodiments, step 806 includes determining a position of the consumer within a POS (e.g., a specific cashier's lane and the like) through a passive engagement between a consumer characteristic (e.g., an image of the consumer, or of a fiducial or barcode in a consumer client device) and alignment with POS systems.

Step 806 includes validating the added value certificate.

Step 808 includes instructing a network terminal collocated with the consumer, to provide the validated added value certificate to the consumer.

Step 810 includes instructing the network terminal to provide an error message for the consumer when the added value certificate is invalid.

Hardware Overview

Figure 9:
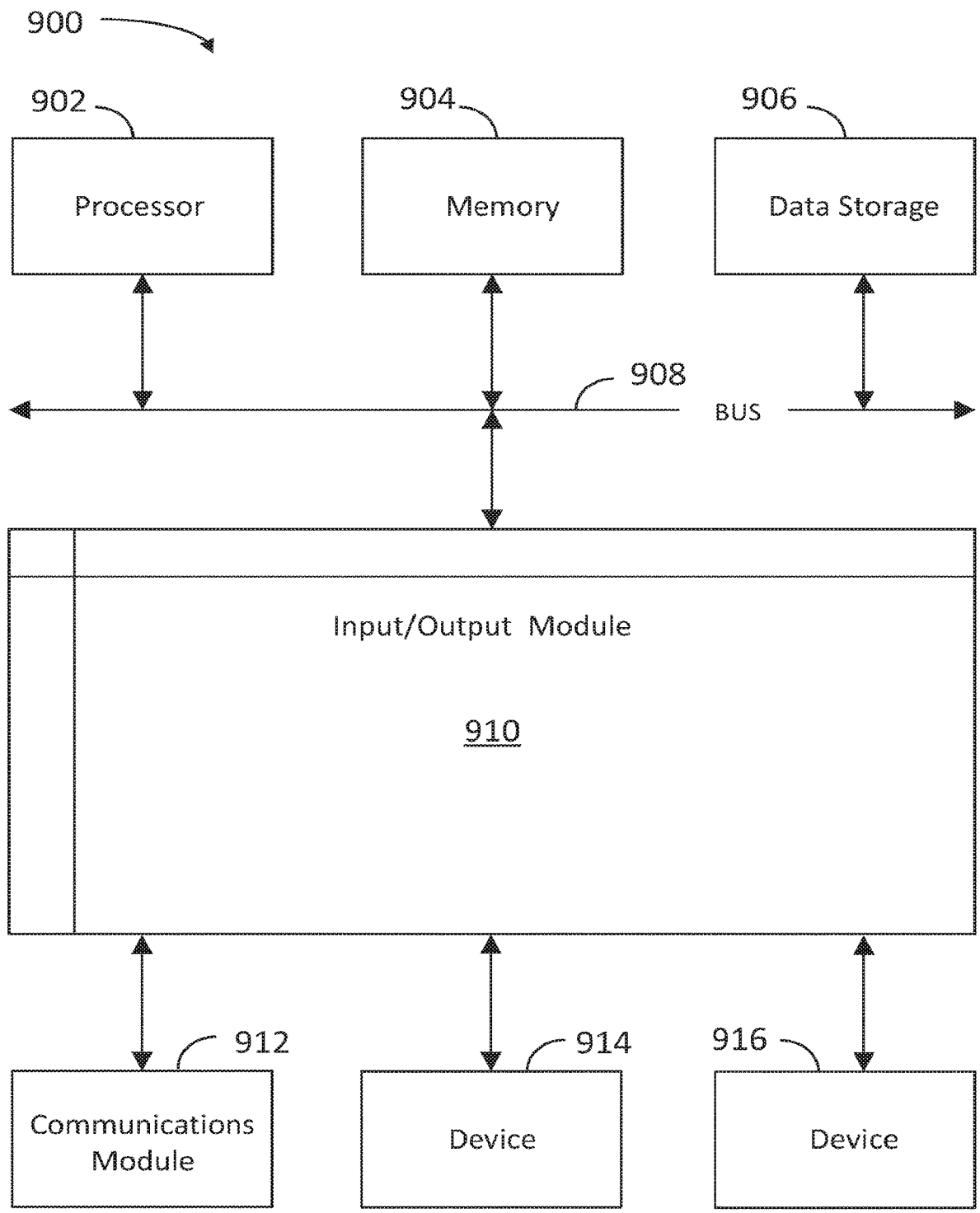
FIG. 9 is a block diagram illustrating an example computer system with which the client and network device of FIG. 1 and the methods of FIGS. 3-5 can be implemented.

FIG. 9 is a block diagram illustrating an example computer system 900 with which the client and network device of FIG. 1 and the methods of FIGS. 4-5 can be implemented. In certain aspects, computer system 900 may be implemented using hardware or a combination of software and hardware, either in a dedicated network device, or integrated into another entity, or distributed across multiple entities.

Computer system 900 (e.g., client device 130 and remote server 100) includes a bus 908 or other communication mechanism for communicating information, and a processor 902 (e.g., processors 312) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 320), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program consumer products, e.g., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 318) include networking interface cards, such as Ethernet cards and modems. In certain aspects, input/output module 910 is configured to connect to a plurality of devices, such as an input device 914 (e.g., input device 314) and/or an output device 916 (e.g., output device 316). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback (e.g., visual feedback, auditory feedback, or tactile feedback), and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, client device 130 and server 100 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of, or in combination with, software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data network device, or that includes a middleware component, e.g., an application network device, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication (e.g., a communication network). The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and network devices. A client and network device are generally remote from each other and typically interact through a communication network. The relationship of a client and network device arises by virtue of computer programs running on the respective computers and having a client-network device relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

Embodiments disclosed herein include:

A. A computer-implemented method that includes receiving, from a consumer, a client device identification though an application running in a client device. The computer-implemented method includes matching client device 130 identification with a loyalty card for a retail store, identifying a shopping history for consumer, associated with the retail store, in a database, based on the loyalty card, and requesting, through the application, any information from consumer, based on the shopping history. The computer-implemented method also includes verifying the identity of consumer when at least a portion of the information matches the shopping history associated with the retail store, for consumer, and providing an offer to consumer, through the application running in the client device, of a product in the retail store.

B. A system that includes memory storing instructions, and one or more processors configured to execute the instructions to receive, from a consumer, a client device identification though an application running in a client device. The one or more processors also execute instructions to match client device 130 identification with a loyalty card for a retail store, to identify a shopping history for consumer, associated with the retail store, in a database, based on the loyalty card, and to request, through the application, any information from consumer, based on the shopping history. The one or more processors also execute instructions to verify an identity of consumer when at least a portion of the information matches the shopping history associated with the retail store, for consumer, and to provide an offer to consumer, through the application running in the client device, of a product in the retail store.

C. A computer-implemented method that includes identifying, at a remote server, a consumer at a point of sale location, wherein consumer checks out multiple products in a shopping basket. The computer-implemented method also includes informing consumer that a rebate is due on at least one product from the shopping basket, and instructing a network terminal to provide a valid rebate voucher for at least one product, to consumer. The computer-implemented method also includes providing a running total of earned rebates and points for display in an application run in a client device used by consumer, and communicating to consumer whether the rebate has been credited to a consumer account accessible to the remote server.

Each of embodiments A, B, and C may have one or more of the following additional elements in any combination, as follows. Element 1, wherein requesting the information from consumer includes querying consumer about one or more items in the shopping history. Element 2, wherein verifying the identity of consumer includes performing a differential analysis of buying patterns for consumer based on the shopping history. Element 3, wherein verifying the identity of consumer includes correlating client device 130 identification with multiple databases associated with multiple retail stores. Element 4, further includes mapping the identity of consumer to client device 130 identification and storing a map including client device 130 identification in a database. Element 5, wherein verifying the identity of consumer includes verifying that consumer provides at least one correct answer to multiple questions based on the shopping history. Element 6, further includes providing to consumer, through the application in the client device, an advertisement for the product in the retail store before receiving client device 130 identification. Element 7, further includes applying the offer to consumer when consumer purchases the product in the retail store. Element 8, further includes receiving, from consumer, a second client device identification from a second client device associated with a same loyalty card for the retail store. Element 9, wherein the shopping history for consumer is associated with multiple retail stores and services, and requesting any information from consumer includes querying consumer about multiple items purchased in the retail stores or services.

Element 10, further includes crediting the rebate to consumer account after consumer has purchased at least one product. And element 11, further includes correlating the multiple products checked out by a point of sale device at the point of sale location with an identity of consumer at the point of sale location.

In one aspect, a method may be an operation, an instruction, or a function and vice versa. In one aspect, a claim may be amended to include some or all of the words (e.g., instructions, operations, functions, or components) recited in one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of X, Y, and Z" or "at least one of X, Y, or Z" each refer to only X, only Y, or only Z; any combination of X, Y, and Z; and/or at least one of each of X, Y, and Z.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software consumer products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
matching, in a remote server, a client device identification with a loyalty card for a retail store;
identifying a shopping history for a consumer, associated with the retail store, in a database, based on the loyalty card;

requesting, through an application running in a client device, an information from the consumer, based on the shopping history;
verifying, in the remote server, an identity of the consumer when at least a portion of the information matches the shopping history associated with the retail store, for the consumer, wherein verifying the identity of the consumer further comprises comparing different buying patterns for the consumer based on the shopping history;
providing, from the remote server, an offer to the consumer, through an application running in the client device, of a product in the retail store;
correlating multiple items in a shopping basket received from the consumer through the application running in the client device with multiple items in a shopping basket scanned by a point of sale device;
validating an offer to the consumer at a time and a place for a consumer transaction; and
providing, from the remote server, the offer to the consumer, through the application running in the client device, of a product in the retail store.

2. The computer-implemented method of claim 1, wherein requesting the information from the consumer comprises querying the consumer about one or more items in the shopping history.

3. The computer-implemented method of claim 1, wherein verifying an identity of the consumer comprises receiving, from the client device, an identifier for a point of sale device, the identifier comprising a pre-selected time-varying pattern.

4. The computer-implemented method of claim 1, wherein verifying an identity of the consumer comprises correlating the client device identification with multiple databases associated with multiple retail stores.

5. The computer-implemented method of claim 1, wherein verifying an identity of the consumer further comprises receiving, from the client device, an identifier for a point of sale device the identifier comprising a pre-selected time-varying pattern identifying a time and a place for a consumer transaction before the consumer transaction occurs.

6. The computer-implemented method of claim 1, wherein verifying an identity of the consumer comprises verifying that the consumer provides at least one correct answer to multiple questions based on the shopping history.

7. The computer-implemented method of claim 1, further comprising identifying a time and a place for a consumer transaction before the consumer transaction occurs based on a pre-selected time-varying pattern and a correlation with the point of sale device.

8. The computer-implemented method of claim 1, further comprising applying the offer to the consumer when the consumer purchases the product in the retail store.

9. The computer-implemented method of claim 1, further comprising receiving, from the consumer, a second client device identification from a second client device associated with a same loyalty card for the retail store.

10. The computer-implemented method of claim 1, wherein the shopping history for the consumer is associated with multiple stores, and requesting an information from the consumer comprises querying the consumer about multiple items purchased in the stores.

11. A system, comprising:
a memory circuit storing multiple instructions; and
one or more processors configured to execute the instructions to cause the system to:
identify a shopping history for a consumer, associated with a retail store, in a database, based on a loyalty card;
request, through an application running in a client device, an information from the consumer, based on the shopping history;
verify, in a remote server, an identity of the consumer when at least a portion of the information matches the shopping history associated with the retail store, for the consumer, wherein verifying the identity of the consumer further comprises comparing different buying patterns for the consumer based on the shopping history;
provide, from the remote server, an offer to the consumer, through an application running in the client device, of a product in the retail store;
correlate multiple items in a shopping basket received from the consumer through the application running in the client device with multiple items in a shopping basket scanned by a point of sale device;
validate an offer to the consumer at a time and a place for a consumer transaction; and
provide, from the remote server, the offer to the consumer, through the application running in the client device, of a product in the retail store.

12. The system of claim 11, wherein to request the information from the consumer the one or more processors execute instructions to query the consumer about one or more items in the shopping history.

13. The system of claim 11, wherein to verify the identity of the consumer the one or more processors execute instructions to compare different buying patterns for the consumer based on the shopping history.

14. The system of claim 11, wherein to verify the identity of the consumer the one or more processors execute instructions to correlate a client device identification with multiple databases associated with multiple retail stores.

15. The system of claim 11, wherein the one or more processors further execute instructions to map the identity of the consumer to a client device identification and to store a map including the client device identification in a database.

16. The system of claim 11, wherein to verify the identity of the consumer the one or more processors execute instructions to verify that the consumer provides at least one correct answer to multiple questions based on the shopping history.

17. The system of claim 11, wherein the one or more processors further execute instructions to provide to the consumer, through the application in the client device, an advertisement for the product in the retail store before receiving a client device identification.

18. A computer-implemented method, comprising:
identifying, at a remote server, a consumer at a point of sale location, wherein the consumer checks out multiple products in a shopping basket;
informing the consumer that a rebate is due, on a product, from the shopping basket;
instructing a network terminal to provide a valid rebate voucher for the product, to the consumer;
providing a running total of earned rebates and points for display in an application installed in a client device used by the consumer;
crediting the rebate to a consumer account after the consumer has purchased the product;
correlating multiple items in a shopping basket received from the consumer through the application installed in the client device with multiple items in a shopping basket scanned by a point of sale device;

identifying a time and a place for a consumer transaction before the consumer transaction occurs, based on a pre-selected time-varying pattern and a correlation with the point of sale device; and updating, in the remote server, the consumer account with an offer to the consumer based on a purchase of the product.

19. The computer-implemented method of claim 18, wherein identifying, at the remote server, the consumer at the point of sale location, further comprises receiving, from the client device, an identifier for a point of sale device, the identifier comprising a pre-selected time-varying pattern.

20. The computer-implemented method of claim 18, further comprising correlating the multiple products checked out by a point of sale device at the point of sale location with an identity of the consumer at the point of sale location.

* * * * *